Sept. 3, 1963　　　　　　C. Q. LINVILLE　　　　　　3,102,721
PANTAGRAPH EQUILIBRIUM SPRING MECHANISM
Filed Dec. 1, 1961　　　　　　　　　　　　　　2 Sheets-Sheet 1
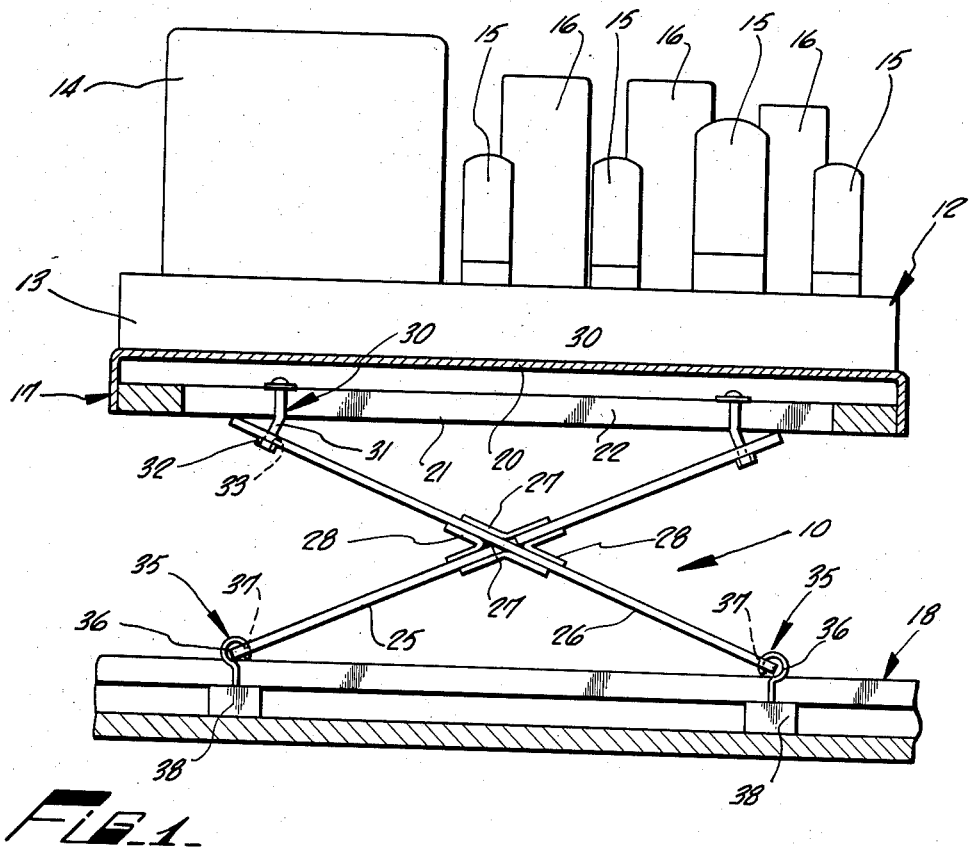
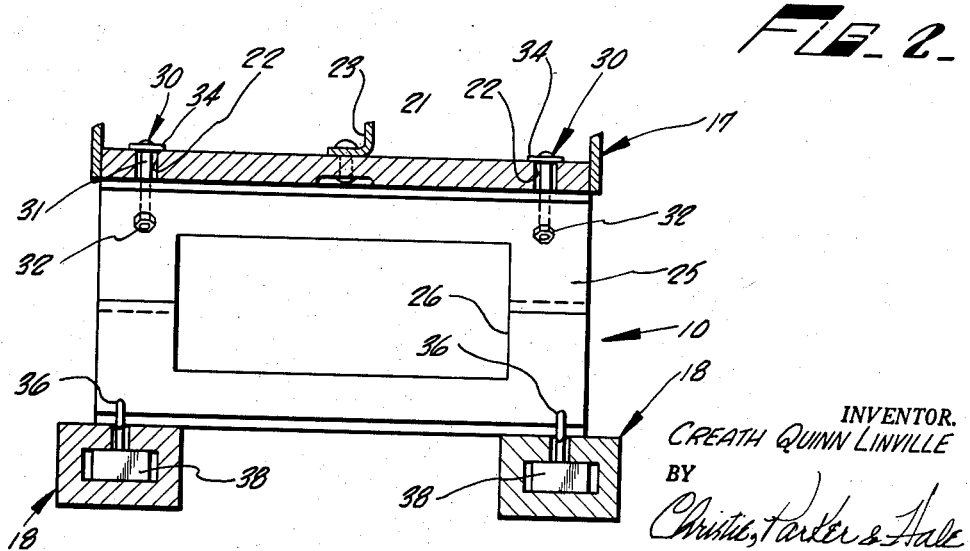
INVENTOR.
CREATH QUINN LINVILLE
BY
Christie, Parker & Hale
ATTORNEYS.

Sept. 3, 1963 C. Q. LINVILLE 3,102,721
PANTAGRAPH EQUILIBRIUM SPRING MECHANISM
Filed Dec. 1, 1961 2 Sheets-Sheet 2
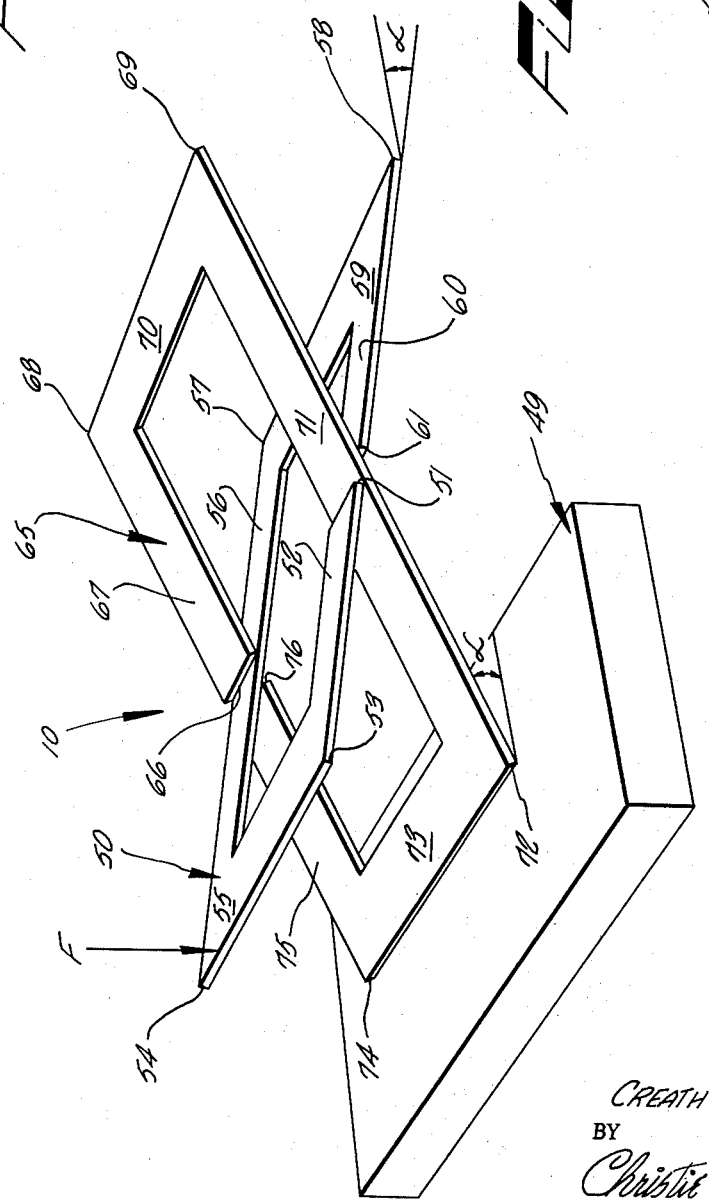
INVENTOR.
CREATH QUINN LINVILLE
BY
Christie Parker & Hale
ATTORNEYS.

United States Patent Office 3,102,721
Patented Sept. 3, 1963

3,102,721
PANTAGRAPH EQUILIBRIUM SPRING
MECHANISM
Creath Quinn Linville, 3601 N. 5th Ave., Phoenix, Ariz.
Filed Dec. 1, 1961, Ser. No. 156,402
7 Claims. (Cl. 267—1)

This invention relates to springs. More particularly it relates to springs which may be loaded eccentrically yet which deflect as though uniformly loaded.

The spring mechanism provided by this invention finds particular utility in shock mountings, particularly in installations where it is desirable that the mounted element be supported so as to be free from angular displacements. Many types of vibration shock mounting elements are known. Generally, such elements are mounted at separate points between the supported element and the supporting foundation. Under loads the supported element will move relative to the foundation in a uniform manner only if the shock mountings are so positioned that the dynamic center-of-gravity of the load corresponds to the dynamic centroid of the supporting system. If the dynamic center-of-gravity load is eccentric to the dynamic centroid of the supporting system, an initial displacing input to the load will cause the load to experience angular oscillation thereafter. Quite often angular oscillation of the load is detrimental to the load and should be avoided. It is common to use viscous damping to minimize such oscillation.

The dynamic center of gravity of the supported article is its center of gravity when the article is in motion or when the article is subjected to acceleration. There are often cases where the dynamic and static centers of gravity are different for the same article.

The dynamic centroid of the suspension system considers that the system is comprised of a plurality of separate elements in separated locations. The dynamic centroid is a function of the geometry of the system and of the characteristics of each element in the system. The spring constant of each element is particularly a factor.

Problems such as those outlined above exist in shock mounting apparatus for electronic equipment. In many instances the electronic equipment can be subjected to vertical loads, accelerations, and displacements better than it can be subjected to cyclic angular displacements. In electronic components, particularly those using vacuum tubes, the cyclic angular displacement, especially if it is of high amplitude and frequency, is destructive of the elements of the vacuum tubes. It is particularly in shipboard and airborne installations that such electronic equipment must be mounted to avoid angular displacements in order to prolong operating life of the equipment.

This invention provides a spring apparatus which is particularly adapted to the shock and vibrational mounting of electronic equipment. This spring means has the property that even though eccentrically loaded, the deflection is uniform across the spring. Where an amplifier having its own power supply and transformer is supported on a spring of this invention, the spring is eccentrically loaded since the major portion of the weight of the amplifier is in the transformer and it is rarely located centrally of the amplifier. If the amplifier is subjected to a shock or vibration, the spring means absorbs the accelerations accompanying such an input and assures that all points of the amplifier move uniformly in relation to the supporting structure. Since the deflection of the spring is uniform, even though actually eccentrically loaded, there is no opportunity for angular oscillations to develop as the spring seeks equilibrium after the initial input.

The spring of this invention may find other applications in automobile suspension systems.

Generally speaking, this invention comprises a pair of angularly oriented interlocking planar spring leaves. Each leaf has a transverse medial slot extending partially across the leaf from one side of the leaf. The leaves are mutually engaged within these slots. When the leaves are so engaged they provide a pair of spaced-apart upper edges and a pair of spaced-apart lower edges. The imposition of a load across one of the upper edges and the adjacent lower edge causes relative movement between these loaded edges as the leaves deflect. This deflection is reflected in movement between the unloaded lower and upper edges. The amounts of movement between the loaded and unloaded edges, respectively, correspond to the geometrical proportions of the interlocking leaves. If the leaves are congruent, the deflections between the loaded and unloaded edges are identical.

These and other features of the invention will be more clearly understood by a reading of the following detailed description of the invention taken in conjunction with the accompanying drawings, wherein:

FIGURE 1 is a side elevational view of the pantagraph spring utilized as a shock mounting for an electronic power amplifier;

FIGURE 2 is an end elevational view of the spring means taken along line II—II of FIGURE 1;

FIGURE 3 is a perspective view of one of the interlocking leaves of the pantagraph spring mechanism; and FIGURE 4 is an enlarged perspective view of the engaged pair of leaves eccentrically loaded.

Referring to FIGURE 1, the spring mechanism 10 provided by this invention is illustrated in conjunction with an electronic power amplifier 12. The amplifier 12 includes a chassis 13 having a power transformer 14, a plurality of vacuum tubes 15, and a plurality of capacitors 16 mounted to the upper surface of the chassis. The amplifier 12 is secured to a tray 17 which is supported by the equilibrium spring mechanism 10. The spring mechanism 10 in turn is supported on a foundation 18. The tray 17 includes an upper cover plate 20 and a bottom plate 21 spaced from the cover plate 20. As illustrated more clearly in FIGURE 2, the bottom plate 21 is provided with a pair of spaced apart longitudinal slots 22 in its central portion. An upstanding central lug or flange 23 is secured to the middle length of the cover plate to support the central portion of the top cover 20.

The spring mechanism 10 includes a pair of interlocked leaves 25 and 26. Flexible positioning and retaining strips 27 and 28 are secured between the leaves 25 and 26 where the leaves intersect (see FIGURE 1). The upper ends of the leaves 25 and 26 are slidably secured to the tray 17 by the connection means 30. The connection means have a shaft 31 with an enlarged head 32. The shaft 31 is passed through an aperture 33 in the springs 25 and 26 and the head 32 is engaged against the underside of the spring leaves 25 and 26. The shaft 31 passes upwardly through the slots 22 in the tray bottom plate 21 to be secured by washers 34.

The foundation members 18 are illustrated in the form of extruded members having upwardly open inverted T-slots therein. An alternate type of sliding connection means 35 is utilized to locate the spring mechanism 10 to the foundation member 18. Each of the connection means 35 has a hook 36 which is engaged within an aperture 37 in the lower end corners of the leaves 25 and 26. The hooks 36 project downwardly through the vertical legs of the T-slot in member 18 to connect to a transversely oriented block 38 held within the transverse portion of the T-slot.

FIGURE 3 shows in perspective one of the pair of leaves 25 or 26 of the spring mechanism 10. The leaf 25 is of rectangular planar configuration substantially in the form of a block letter C. The leaf 25 has a pair of ends 40 and 41, a longitudinal side 42 extending continuously between the ends 40 and 41. Along the other side of the leaf legs 43 and 44 extend toward one another from ends 40 and 41, respectively, but terminate short of each other to form a transverse slot 45 in the leaf 25. The central portion of the leaf 25 is open. The leaf has a thickness $t$ and the slot 45 has a width $w$. The surfaces 46 and 47 transversely of the ends of legs 43 and 44, respectively, define the limits of the slot 45.

In FIGURES 1 to 4, the leaves of the spring 10 are illustrated to be congruent with one another. The leaves, however, may be of varying lengths relative to one another depending upon the particular applications in which the springs 10 are used.

FIGURE 4 shows an enlarged perspective view of the spring mechanism 10 in conjunction with a block 49. FIGURE 4 is utilized for a "free body" analysis of the behavior of the spring 10 when subjected to a load F applied to the spring 10 and received by block 49. In the following analysis, the spring includes leaves 50 and 65. Each leaf 50 and 65 is inclined to the horizontal at an angle $\alpha$. It is critical that in fabricating the leaves 50 and 65 the widths of the slots in each leaf be equal to $$\frac{t}{\sin \alpha}$$

Leaf 50 has an edge 51 at the free end of the upper cantilevered arm 52. The upper corner of the spring 50 associated with arm 52 is designated at 53. The other upper corner of spring 50 is designated as 54 with the substantially horizontal transverse end portion between corners 53 and 54 identified as 55. From corner 54 the continuous longitudinal side 56 of leaf 50 extends to lower corner 57. The adjacent lower corner 58 defines the limit of the lower transverse portion 59. From corner 58 the other cantilevered leg 60 of leaf 50 extends to end 61.

The other leaf 65 of the pair comprising the spring mechanism 10 is engaged obliquely with leaf 50 in the slot between ends 51 and 61 of cantilevered legs 52 and 60, respectively. The end 66 of a cantilevered leg 67 of leaf 65 extends from free end 66 to terminate at upper leaf corner 68. Between corner 68 and the adjacent upper corner 69 is the upper torsional portion 70 of leaf 65. The continuous side leg 71 of leaf 65 extends angularly downward from corner 69 between ends 51 and 61 of spring leaf 50 to a lower leaf corner 72. The lower torsional portion 73 of leaf 65 lies between corner 72 and adjacent lower corner 74. From corner 74 the other cantilevered leg 75 of leaf 65 extends upwardly to terminate at the edge 76.

Considering the spring mechanism 10 as a free body with force F applied across along edge 53—54 of leaf 50, let it first be assumed that the spring leaf 50 is rigid. Because of the interlock with leaf 65, force F is transmitted from upper end 55 of leaf 50 to the junction of ends 66 and 76 of cantilevered arms 67 and 75 of spring leaf 65. Load F is ultimately transferred vertically to block 49. When force F is manifested between the ends of cantilevered legs 67 and 75, a racking or lateral displacement occurs between the ends 66 and 76 of these legs. The displacement of end 76 of leg 75 subjects leg 75 to a bending moment relative to the lower transverse end 73 of leaf 65. The transverse portion 73 of the leaf 65 is placed in torsion and transfers the bending moment from cantilevered leg 75 to the continuous side portion 71. Simultaneously with the above, the application of force F to the upper transverse portion 55 of spring 50 also causes a bending moment to be imposed in the upper cantilevered leg 67 of spring leaf 65. This bending moment places the upper transverse end portion 70 of spring 65 in torsion. This torque is manifested in a bending moment in the continuous longitudinal portion 71 of spring 65.

The result of the torques in end transverse portions 70 and 73 of spring 65 are opposite to one another with respect to the continuous side portion 71 such that there is no deflection in portion 71 from these torques. If it is assumed that the lower transverse element 73 of leaf 65 is fixed in space, then the upper edge 68—69 of leaf 65 tends to move downwardly by virtue of the counterclockwise torque in side element 71 in the vicinity of corner 72. If edge 68—69 is fixed in space, then the lower edge 72—74 tends to move upwardly by virtue of the counterclockwise torque in the area of corner 69. The net result of these incipient displacements is that the overall height of the interlocking spring leaves is reduced. Correspondingly angle $\alpha$ tends to be reduced.

In reducing angle $\alpha$, the interlock clearance between ends 51 and 61 and 66 and 76, equal to $$\frac{t}{\sin \alpha}$$

is reduced, at least apparently. However, since this is a physical system with the actual clearances between 51 and 61 and 66 and 76 being fixed, the only way to accommodate a decrease in angle $\alpha$ is for ends 51 and 62 to rack or move transversely oppositely from one another. This produces the same result as occurs in leaf 65 where it was assumed initially that leaf 50 was rigid upon application of force F. Even though the initial assumption was in error, it is now corrected. Thus, the transverse end portions 55 and 59 of leaf 50 are put in torsion when the cantilever arms 52 and 60, respectively, are subjected to bending loads by virtue of the racking between end surfaces 51 and 61. These torsional moments are opposite in effect along the continuous side leg 56 of leaf 50, with the deflections induced in leg 56 being subtractive as was the case in side 71 of leaf 65. In this manner the load originally applied between the edges 53—54 and 72—74 is transferred between both of the spring leaves 50 and 65 of the equilibrium and leveling spring mechanism 10 such that edge 68—69 moves downwardly the same distance as edge 53—54 even though the edge 68—69 is unloaded. This occurs so long as the spring leaves 50 and 65 have the same dimensions and are fabricated from materials having the same values for Young's modulus and the torsional modulus. Different physical properties will produce proportionally different relative displacements.

It is not rigorously true that there is no deflection in the continuous side rails 56 or 71 of leaves 50 and 65, respectively. It is true that the torsional moments transferred from end portions 70 and 73 to side rail 71, and from end portions 55 and 59 to side rail 56, are equal and are applied such that there is no deflection of rails 56 and 71 from these torques. But it was assumed that ends 66 and 76 of cantilever legs 67 and 75, respectively, and likewise ends 51 and 61, deflected against side rails 56 and 71, respectively. In this regard a couple is applied about the mid-length of side rail 56 by cantilever legs 66 and 76. Because of the angle α, the arm of the couple equals $$\frac{t}{\sin \alpha}$$

The forces of the couple are applied normal to cantilever arm ends 66 and 76 or, because of the geometry, at an angle of 2α to side rail 56. These forces are modified by a factor of sin 2α when applied to the leg 56. But sin 2α=2(sin α) (cos α). The arm is $$\frac{t}{\sin \alpha}$$

thus the couple has a value of $$\left(\frac{t}{\sin \alpha}\right)(2 \sin \alpha \cos \alpha)$$

or 2t cos α. This couple acts on the continuous side leg 56 of leaf 50 in opposition to the torques from the ends 55 and 59 of the leaf 50 such that end 55 tends to move upwardly against the force F. The same is true for leg 71. The couples in the continuous legs 56 and 71 are internal with respect to the system. They are factors only in calculating the spring constant of the overall spring mechanism 10 and do not affect the externally observed performance of the system.

It is noteworthy that when force F is applied to end 55 of leaf 50, the base 49 mounting the spring mechanism 10 receives force only from lower arm 73 of leaf 65 so long as the spring is horizontal. From this it is seen that each half (divided about a vertical plane) of the spring transfers to the base only that load which is imparted to the leaf directly above. In a dynamic system, spring mechanisms 10 such as these may be used to determine the center of gravity of a load if each lower arm 59 or 73 of the spring mechanism 10 is connected to a separate accelerometer or other sensing mechanism.

The leaves of any spring 10 fabricated according to the teachings of this invention need not have rectangular configuration. It is critical only that they have a central opening and a slot from one side of the leaf to the opening.

While the invention has been described above in connection with a specific environment, this has been merely by way of exemplifying the preferred form of the invention and is not intended as, nor should it be considered as, a limitation to the scope of the invention.

I claim:

1. A uniformly deflecting spring means comprising a pair of interlocking leaves, each leaf having spaced apart sides and spaced apart ends enclosing an open central portion of the leaf, a transverse medial slot extending partially across the leaf from one side thereof into communication with the open central portion of said leaf and in which the other side of the other leaf is engaged, the engaged leaves providing a pair of spaced-apart upper edges and a pair of spaced-apart lower edges along the ends of the leaves, imposition of a load across one upper edge and the adjacent lower edge causing relative movement therebetween by deflection of the leaves and causing the unloaded upper and lower edges to move relative to one another in the same manner as the movement between the loaded edges.

2. A uniformly deflecting spring means consisting of a pair of interlocking leaves, each leaf having spaced apart sides and spaced apart ends enclosing an open central portion of the leaf, a transverse medial slot extending partially across the leaf from one side thereof into communication with the open central portion of said leaf and in which the other side of the other leaf is engaged, the engaged leaves providing a pair of spaced-apart upper edges and a pair of spaced-apart lower edges along the ends of the leaves, imposition of a load across one upper edge and the adjacent lower edge causing relative movement therebetween by deflection of the leaves and causing the unloaded upper and lower edges to move relative to one another in the same manner as the movement between the loaded edges.

3. An eccentrically loadable, uniformly deflecting spring means comprising a pair of coaxially interlocking planar leaves of resilient material, each leaf having spaced apart end portions and spaced apart side portions enclosing an open central portion thereof, a transverse medial slot extending across one side portion of each leaf into communication with the central portion of said leaf and defining a pair of cantilever arms extending to the slot from the ends of said leaf and in which the other side portion of the other leaf is engaged, the ends of the arms of each leaf engaging said other side portion of the other leaf, the engaged leaves providing a pair of spaced-apart upper edges and a pair of spaced-apart lower edges, imposition of a load across one upper edge and the adjacent lower edge causing relative movement therebetween by deflection of the leaves and causing the unloaded upper and lower edges to move relative to one another in the same manner as movement between the loaded edges.

4. An eccentrically loadable, uniformly deflecting spring means comprising a pair of coaxially interlocking planar leaves having spaced apart side edges with corresponding side portions adjacent thereto, each leaf having a transverse medial slot extending partially across the leaf from one side edge thereof into communication with an open central portion of the leaf and in which the side portion associated with the other side of the other leaf is engaged, the width of the slot of each leaf being determined as a function of the thickness of the other leaf and of the unloaded angular relation between the leaves, the engaged leaves providing a pair of spaced-apart upper edges and a pair of spaced-apart lower edges, imposition of a load across one upper edge and the adjacent lower edge causing relative movement therebetween by deflection of the leaves and causing the unloaded upper and lower edges to move relative to one another in the same manner as movement between the loaded edges in proportion to the average distances of the loaded and unloaded edges from the points of interlocking connection of the leaves.

5. An eccentrically loadable uniformly deflecting spring means consisting of a pair of congruent coaxially planar interlocking leaves having spaced apart side edges with corresponding side portions adjacent thereto, each leaf having a transverse medial slot extending partially across the leaf from one side edge thereof into communication with an open central portion of the leaf and in which the side portion associated with the other side of the other leaf is engaged, the width of the slot of each leaf being determined as a function of the thickness of the other leaf and of the unloaded angular relation between the leaves, the engaged leaves providing a pair of spaced-apart upper edges and a pair of spaced-apart lower edges, imposition of a load across the upper edge and the adjacent lower edge causing relative movement therebetween by deflection of the leaves and causing the unloaded upper edge and the lower edge to move relative to one another in the same manner as movement between the loaded edges in proportion to the distances of the loaded and unloaded edges from the points of interlocking connection of the leaves.

6. A uniformly deflecting spring means comprising a pair of rectangularly configured interlocking planar leaves of resilient material, each leaf having spaced apart longitudinal sides and spaced apart ends enclosing an open central portion of the leaf, a slot intermediate the spaced apart ends of the leaf extending from one side into communication with the open central portion of said leaf and defining aligned cantilevered arms extending from the spaced apart ends of the leaf to ends defining the slot, each leaf being engaged with the other leaf in a manner whereby the other side of each leaf is engaged within the slot of the other leaf with the ends of the cantilever arms of said other leaf engaging the other side of said each leaf.

7. Spring means according to claim 6 wherein the leaves are identically configured and the slot in each leaf is midway between the ends of each leaf, the leaves being of equal thickness $t$ and being inclined relative to one another at an angle of $2\alpha$, the distance between the ends of the cantilever arms of each leaf defining parallel walls of the slot and being spaced apart a distance equal to $t/\sin \alpha$.

References Cited in the file of this patent

UNITED STATES PATENTS

| | | |
|---|---|---|
| 289,361 | Sweet | Nov. 27, 1883 |
| 2,269,385 | Tipton | Jan. 6, 1942 |
| 2,913,672 | Gilchrist et al. | Nov. 17, 1959 |